US012665690B2

(12) United States Patent
Neugeboren et al.

(10) Patent No.: US 12,665,690 B2
(45) Date of Patent: Jun. 23, 2026

(54) SYSTEMS AND METHODS FOR SUPPORTING PHASE ADJUSTMENTS OVER DOCSIS

(71) Applicant: ARRIS Enterprises LLC, Suwanee, GA (US)

(72) Inventors: Yair Neugeboren, Netanya (IL); Gregory J. Cyr, Winfield, IL (US)

(73) Assignee: ARRIS Enterprises LLC, Horsham, PA (US)

( * ) Notice: Subject to any disclaimer, the term of this patent is extended or adjusted under 35 U.S.C. 154(b) by 186 days.

(21) Appl. No.: 18/244,843

(22) Filed: Sep. 11, 2023

(65) Prior Publication Data

US 2024/0146566 A1 May 2, 2024

Related U.S. Application Data

(63) Continuation of application No. 17/674,390, filed on Feb. 17, 2022, now abandoned.

(60) Provisional application No. 63/150,966, filed on Feb. 18, 2021.

(51) Int. Cl.
*H04L 12/28* (2006.01)
*H04J 3/06* (2006.01)

(52) U.S. Cl.
CPC ........ *H04J 3/0667* (2013.01); *H04L 12/2801* (2013.01); *H04L 12/2861* (2013.01); *H04L 12/2869* (2013.01)

(58) Field of Classification Search
CPC ............. H04L 12/2801; H04L 12/2861; H04L 12/2869; H04J 3/0667; H04J 3/14; H04N 21/4425; H04N 21/6118
See application file for complete search history.

(56) References Cited

U.S. PATENT DOCUMENTS

| | | |
|---|---|---|
| 2015/0146712 A1 | 5/2015 | Jin |
| 2015/0207579 A1 | 7/2015 | Chapman et al. |
| 2015/0295669 A1* | 10/2015 | Chapman .............. H04L 27/345 |
| | | 370/503 |
| 2018/0205452 A1* | 7/2018 | Stephens .............. H04B 7/2684 |
| 2020/0244505 A1 | 7/2020 | Hewavithana et al. |

OTHER PUBLICATIONS

"Data Over Cable Service Interface Specifications DOCSIS 4.0", MAC and Upper Layer Protocols Interface Specification, Cable Labs, 2019 (Year: 2019).*

(Continued)

*Primary Examiner* — Omer S Mian
(74) *Attorney, Agent, or Firm* — Chernoff, Vilhauer, McClung & Stenzel, LLP

(57) ABSTRACT

A method for adjusting a phase error includes a first device detecting a phase error at a timing interface of the first device. The first device modifying a DOCSIS timing protocol parameter based upon the detected phase error. The first device causing a modification of a second device's timestamp output in a manner based upon the detected phase error by the modification of the DOCSIS timing protocol parameter.

4 Claims, 8 Drawing Sheets

710 — DETECT PHASE ERROR AT PTP INTERFACE OF CMTS

730 — INTRODUCE VIRTUAL PHASE STEP BY INCREMENTING THE CMTS PTP INGRESS TIME STAMP

700 — MODIFY DTP TIME ADJUSTMENT PARAMETER

720 — CABLE MODEM'S PTP MASTER CLOCK TIMESTAMP OUTPUT ALIGNED WITH DETECTED CMTS INGRESS PTP

740 — PUSHING DOCSIS SYMBOL FREQUENCY

(56) References Cited

OTHER PUBLICATIONS

"Data-Over-Cable Service Interface Specifications DOCSIS 4.0 MAC and Upper Layer Protocols Interface Specification", ITU-T Draft; Study Period 2017-2020; Study Group 9, International Tele-communication Union, Geneva ; CH, Feb. 17, 2020 (Feb. 17, 2020), pp. 1-953, XP044289244, Retrieved from the Internet at : www.itu.int/ifa/t/2017/sg9/docs/c/ties/T17-SG09-C-0112!!ZIP-E.zipDOCSIS%204.0/CM-SP-MULPIv4.0-101-190815.pdf, retrieved on Feb. 17, 2020, pp. 492-497, p. 303.

CA3123009A1 (Arris Enterprises LLC [US]) Jun. 18, 2020 (Jun. 18, 2020), the whole document.

International Search Report and Written Opinion RE: Application No. PCT/US2022/016755, dated May 31, 2022.

"MAC and Upper Layer Protocols Interface Specification" Cable Television Laboratories, 2019 (Year: 2019).

Office Action in Japanese Patent Application No. 2023-549885, mailed Oct. 7, 2025.

* cited by examiner

810 — DETECT PHASE ERROR AT PTP INTERFACE OF CMTS

800 — MODIFY DTP TIME ADJUSTMENT PARAMETER

820 — CABLE MODEM'S PTP MASTER CLOCK TIMESTAMP OUTPUT ALIGNED WITH DETECTED CMTS INGRESS PTP

830 — ADJUST DTP TIME ADJUSTMENT PARAMETER

840 — DOCSIS CLOCK SLEWING SLOWLY

SYSTEMS AND METHODS FOR SUPPORTING PHASE ADJUSTMENTS OVER DOCSIS

CROSS REFERENCE TO RELATED APPLICATIONS

The present application is a continuation of U.S. patent application Ser. No. 17/674,390 filed Feb. 17, 2022, which claims the benefit of U.S. Provisional Patent Application Ser. No. 63/150,966 filed Feb. 18, 2021.

BACKGROUND

The subject matter of this application generally relates to synchronization of clocks in a transmission network that supports DOCSIS used to deliver data to and from mobile networks.

Although Cable Television (CATV) networks originally delivered television content to subscribers over large distances using exclusively coaxial cable, modern CATV transmission systems have replaced much of that coaxial cable with a more effective optical network, creating a hybrid transmission system where cable content is transmitted over the bulk of the distance from the head using optical fiber and terminating at the subscriber over coaxial cables.

Historically, the head end also included a Cable Modem Termination System (CMTS), used to provide high speed data services such as video, cable Internet, Voice over Internet Protocol, etc. Typically, a CMTS will include both Ethernet interfaces (or other high-speed data interfaces) as well as RF interfaces so that traffic that is coming from the Internet can be routed (or bridged) through the Ethernet interface, through the CMTS, and then onto the optical RF interfaces that are connected to the cable company's hybrid fiber coax (HFC) system. Downstream traffic is delivered from the CMTS to a cable modem in a subscriber's home, while upstream traffic is delivered from a cable modem in a subscriber's home back to the CMTS. Many modern HFC CATV systems have combined the functionality of the CMTS with the television delivery system (EdgeQAM) in a single platform called the Converged Cable Access Platform (CCAP) using Data-Over-Cable Service Interface Specifications (DOCSIS).

As networks have expanded and head ends have accordingly become increasingly congested with equipment, many content providers have recently used distributed architectures to spread the functionality of the CMTS/CCAP throughout the network. This distributed architecture keeps the data and video signals in digital format as long as possible, extending the digital signals beyond the CMTS/CCAP deep into the network before converting them to RF. It does so by replacing the analog links between the head end and the access network with a digital fiber (Ethernet/PON) connection.

One such distributed architecture is the Remote PHY (R-PHY) distributed access architecture, which relocates the physical layer (PHY) of a traditional CMTS or CCAP by pushing it into the network's fiber nodes. Thus, while the core in the CMTS/CCAP performs the higher layer processing, the R-PHY device in the node receives the downstream data sent by the core, performs the downstream PHY functions, converts it from digital to an analog RF signal, and distributes it to the cable modems. In the reverse direction, the R-PHY device in the node receives the upstream RF data sent by cable modems, converts it from analog to digital, performs the upstream PHY functions, and then transmits the digital data optically to the core. The CMTS and R-PHY devices use DOCSIS.

In addition, the DOCSIS architecture has been employed as a mechanism for exchanging data in cellular communications between the core network of a cellular system (typically the global Internet) and the local networks it's communicating with, e.g. a cell tower. This exchange is typically referred to as the "x-haul" portion of cellular communications which includes backhaul, midhaul, and fronthaul. Cellular networks, however, also require synchronization of the backhaul, midhaul, and fronthaul portion of the network with the mobile base stations, with its own set of unique timing requirements. The DOCSIS network may also be used to provide synchronization to the mobile network. Thus, using the DOCSIS network as the x-haul for cellular communications presents a challenge because the DOCSIS compliant devices have timing considerations that they must adhere to that may conflict with the timing and synchronizing requirements of the mobile network especially when phase corrections are needed such as, for example, after regaining connection to a master clock following a holdover. The DOCSIS network could be a traditional CMTS, remote PHY system, a remote MAC-PHY system, or otherwise. In some cases, the CMTS may need to make large phase adjustments in order to re-lock to its time source, such as, when switching between two master clock sources, which may have a large time offset, such as 20 microseconds.

What is desired, therefore, are improved systems and methods for synchronizing a network device, such as a CMTS, to the timing requirements of a cellular network.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

For purposes of the disclosure and the claims, the following terms are defined so as to more easily understand the subject matter described and claimed:

Master Clock: a clock that sends timing information to a slave clock for that clock to synchronize its time to that of the master clock.

Slave Clock: a clock that receives timing information from a master clock to synchronize its time to that of the master clock.

Grandmaster Clock: a clock that only operates as a master clock and is the source of time to the packet network:

Ordinary Clock: a slave clock that has a single port receiving timing information from a master clock.

Boundary Clock: a clock that operates as both a slave and a master by having one port in a slave state receiving time from a master clock, and one or more ports in a maser state which disseminate timing information to downstream slaves.

Evolved Node B (eNB): a base station used in cellular networks, and which includes not only antennas, receivers, and transmitters, but also resource management and logic control functions historically included in separate base station controllers, thus allowing eNB stations to communicate with each other directly. In addition, a next generation base station (gNB), or otherwise, may be used.

Synchronous Ethernet (SyncE): a computer networking standard that facilitates the transfer of timing signals over an Ethernet physical layer to be used by devices that need them. In this embodiment, the SyncE timing should originate from the same source as the grandmaster.

Ethernet Equipment Clock (EEC): slave clocks in the SyncE protocol that receive synchronization data from an interface connected to an upstream master clock.

The DOCSIS Timing Protocol (DTP) specifies a method of providing a timing reference, and in particular a specific time with respect to another clock reference, at the cable modem. Several common topologies are used to provide proper such synchronization. The DOCSIS Timing Protocol (DTP) is part of the CableLabs DOCSIS 3.1 specification, "Data-Over-Cable Service Interface Specifications DOCSIS® 3.1, MAC and Upper Layer Protocols Interface Specification, CM-SP-MULPIv3.1-I21-201020", incorporated by reference herein in its entirety.

Figures 1, 2:
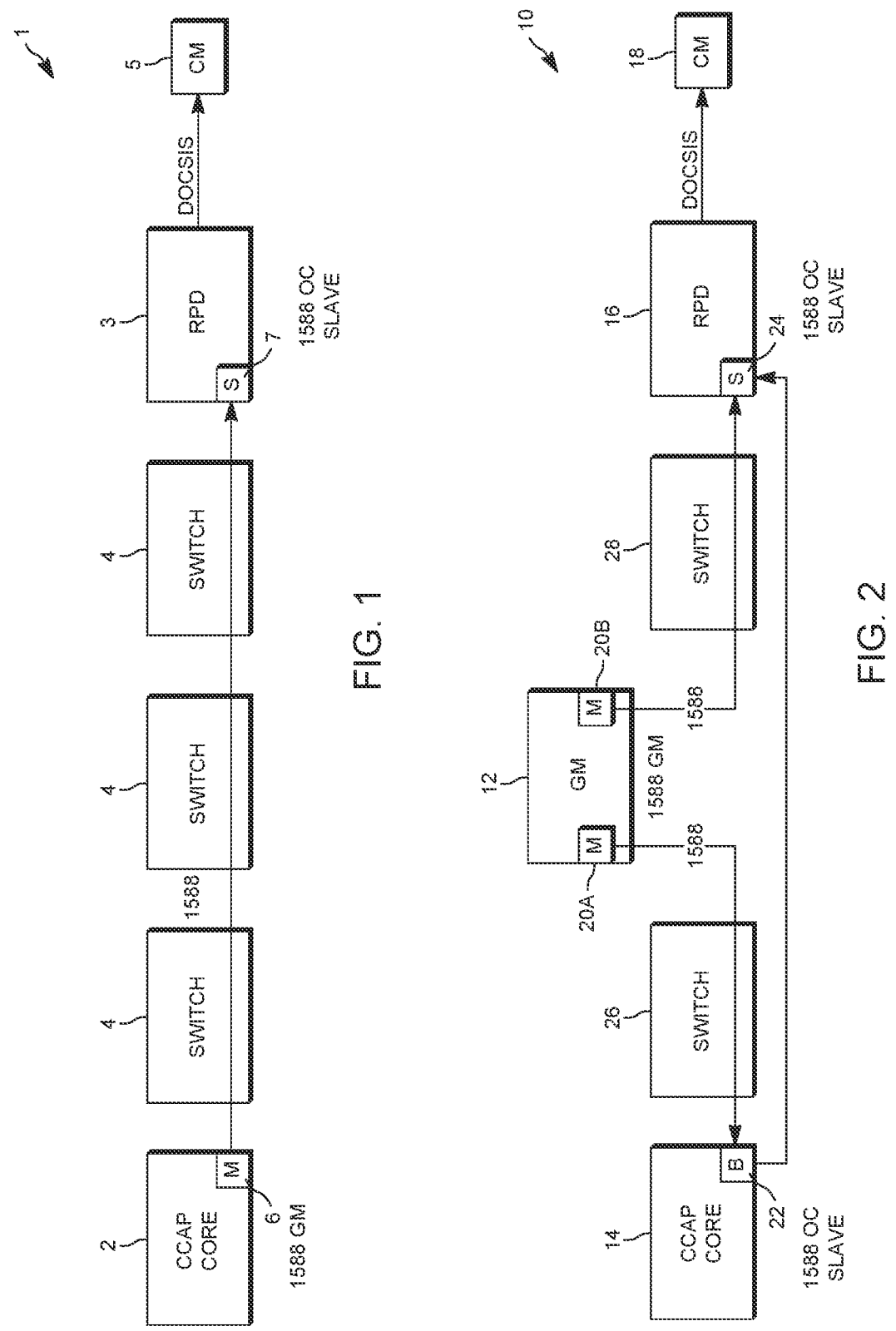
FIG. 1 illustrates an exemplary timing arrangement for an R-PHY architecture where a CCAP core is used as a timing grandmaster (GM) and Remote PHY Devices (RPDs) are the timing slaves.
FIG. 2 illustrates an exemplary timing arrangement for an R-PHY architecture where both a CCAP core and its RPDs are timing slaves to an external grandmaster.

Referring to FIG. 1, for example, a first topology may include a CCAP core 2 synchronized with an RPD 3 connected together via a plurality of network switches 4. The RPD 3 is in turn is connected to one or more cable modems 5. Synchronization is attained by a grandmaster clock 6 in the core 2 which sends timing information to a slave clock 7 in the RPD 3. Those of ordinary skill in the art will appreciate that, although FIG. 1 shows only one RPD 3 connected to the core 2, many such RPDs may be simultaneously connected to the core 2, with each RPD having a slave clock 7 receiving timing information from the grandmaster clock 6 in the core. The switches 4 may be any combination of participating and non-participating switches. Those of ordinary skill in the art will appreciate that, although FIG. 1 shows the RPD 3 connected to the core 2, the RPD 3 may be omitted, with each CM having a slave clock receiving timing information from the grandmaster clock 6 in the core typically through the CCAP core 2.

FIG. 2 shows a second topology 10 to provide synchronization between a CCAP core 14 and an RPD 16, which again is connected to one or more cable modems 18. Unlike the system of FIG. 1, however, a separate timing grandmaster device 12 provides timing information to both the CCAP core 14 and the RPD 16. Specifically, the timing grandmaster 12 has a first master port 20a connected to a boundary clock 22 in the CCAP core 14 and a second master port 20b connected to a slave clock 24 in the RPD 16. The boundary clock 22 may therefore be a slave to the grandmaster 12 but a master to the slave clock 24 in the RPD. Those of ordinary skill in the art will recognize that the respective clocks of the CCAP core 14 and the RPD 16 may both be connected to a single master port in the timing grandmaster device 12, and the use of separate timing ports 20a and 20b in FIG. 2 is used merely to more easily describe the separate timing processes. The CCAP core 14 may be connected to the timing grandmaster 12 through one or more switches 26 while the RPD 16 may be connected to the timing grandmaster 12 through one or more switches 28. The switches 26 may be any combination of participating and non-participating switches. Again, those of ordinary skill in the art will appreciate that, although FIG. 2 shows only one RPD 16 connected to the timing grandmaster 12, many such RPDs may be simultaneously connected to the grandmaster 12, with each RPD having a slave clock 24 receiving timing information from a port 20b in the grandmaster clock 12. Again, those of ordinary skill in the art will appreciate that, although FIG. 2 shows the RPD 16 connected to the timing grandmaster 12, such RPDs may be omitted, with each cable modem having a slave clock receiving timing information from a port 20b in the grandmaster clock 12.

While the CMTS 14 and/or the RPD 16 and/or the cable modem 18 are locked with the timing grandmaster 12, no significant problems occur, but problems will occur when either the RPD 16 and/or the CMTS 14 and/or the cable modem 18 lose connection to the timing grandmaster 12. In that holdover period where one or more devices have no connection to the timing clock of the grandmaster 12, the unconnected devices will drift in frequency and phase from the timing grandmaster 12 and from the other device(s). The magnitude of that drift will depend on many factors, including the length of the holdover period, temperature variations, internal oscillator performance, etc. For example, an RPD with a typical TCXO oscillator might drift 1 ms in phase even within one hour.

When connection to the timing grandmaster 12 is restored, the CMTS 14 and/or the RPD 16 and/or the cable modem 18, would measure its phase offset from the grandmaster 12 and would need to adopt one of two methods to correct the offset and re-establish synchronization in both phase and frequency. Ideally, because any sufficiently large phase step adjustment would cause connected cable modems to go offline, the RPD 16 and/or core 14 only changes its frequency relative to that of the grandmaster 12 to compensate for the phase offset, until such time as the phases are within tolerances, after which the frequency would be set to that of the grandmaster 12. However, to maintain DOCSIS compliance (e.g., CableLabs DOCSIS 3.1), frequency adjustments must be less than a specified threshold, so compensating for phase drift by frequency adjustments may often take a long time to achieve a desired phase adjustment.

As previously noted, growth in mobile data consumption has put pressure on mobile network operators to build out small cell networks, where all the network traffic needs to be x-hauled to the mobile core. Modern cell architectures employ the LTE (Long Term Evolution) 4G standard, or 5G standard, or otherwise, which provides for high speed wireless communications for mobile users sufficient to access the Internet to experience services such as data, voice and video from a mobile network. While such standards permit both time division duplex (TDD) and frequency division duplex (FDD), this disclosure will assume that the disclosed systems employ FDD merely for purposes of illustration.

While such backhaul has been traditional accomplished via fiber and microwave, hybrid fiber coaxial (HFC) networks have been employed as an x-haul mechanism due to its capacity growth, cost efficiency and speed of deployment. Cable Distributed Access Architecture (DAA), including a Remote-PHY (R-PHY) architecture, or a traditional non-distributed architecture may be employed as an x-haul mechanism.

Figure 3:
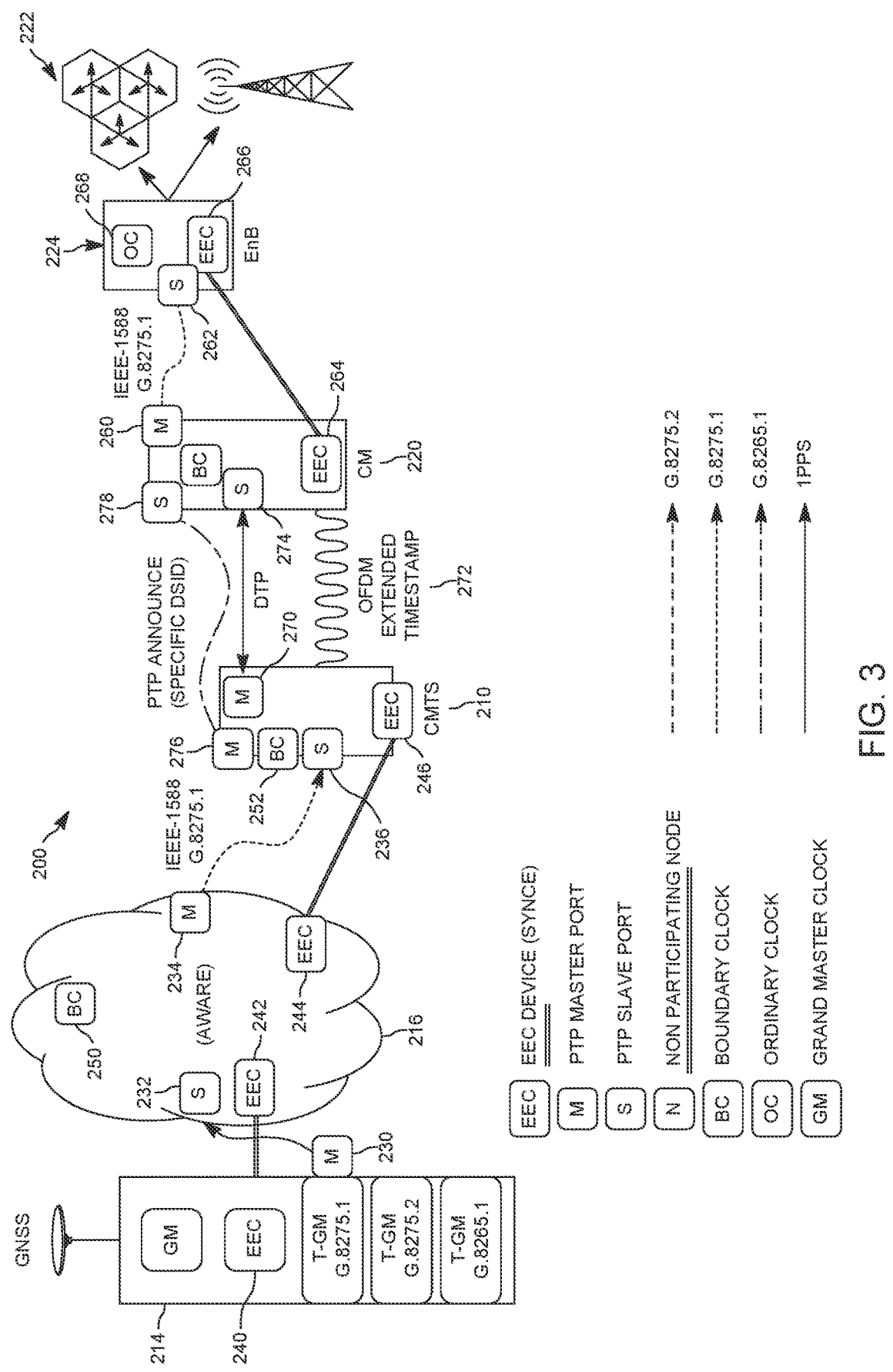
FIG. 3 illustrates an exemplary CMTS architecture used as a backhaul for a cellular network.

Referring for example to FIG. 3, an architecture 200 may include a CMTS 210 connected to a grandmaster clock 214 through a wide area network 216, e.g., the Internet, where the GM clock in turn receives its timing information from a GNSS satellite 218. The CMTS 210 provides the transmission path for CATV services to a cable modem 220, which may include television channels, Internet services, video-on demand, and any other service provided to a customer via a transmission network. In addition to providing CATV services traditionally delivered over the transmission network, the architecture 200 also serves as an x-haul for a cell network 222 that includes an eNB 224 that relays communications between user equipment such as cell phones and the x-haul network to the Internet. In some embodiments, the eNB 224 may be, or part of, a picocell, a small cell, a femto cell, a macro cell, or otherwise.

The architecture 200 shown in FIG. 3 implements a combination of IEEE 1588 and SyncE. The GM clock 214 may include a master port 230 that provides IEEE 1588 timing protocols to a slave port 232 on a device within the network 216. The same or another device within the network may provide a master port 234 that provides IEEE 1588 timing protocols to a slave port 236 on the CMTS 210. The CMTS 210 may use other timing protocols, as desired. The GM clock 214 may also include an EEC clock 240 that provides SyncE to an EEC clock 242 on a device within the network 216. The same or another device within the network may include an EEC clock 244 that provides SyncE to an EEC clock 246 on the CMTS 210. The network 216 may include one or more boundary clocks 250 synchronized to the grandmaster clock 214 and the CMTS 210 may include a boundary clock 252 synchronized to the grandmaster clock 214.

The cable modem 220 may include a master port 260 that provides IEEE 1588 timing protocols to a slave port 262 on the eNB 224. The cable modem may also include an EEC clock 264 that provides SyncE to an EEC clock 266 on the eNB 224. The cable modem 220 may use other timing protocols to the eNB 224. The eNB 224 may include an ordinary clock 268.

The CMTS 210 includes a master entity 270 that provides DOCSIS Timing Protocol (DTP) messages to a slave entity 274 on the cable modem 220. The CMTS 210 includes a master port 276 that provides IEEE 1588 timing protocols to a slave port 278 on the cable modem 220. The cable modem 220 may use other timing protocols, as desired.

The mobile base station needs to be frequency synchronized within 16 ppb (parts per billion) and phase synchronized with up to 1.5 microseconds compared to an absolute time reference. This error budget represents the total error accumulated in the path between the source of time, such as the grandmaster clock 214, and the mobile station end application. Also, IEEE-1588 assumes that the network delay in the forwarding and reverse paths is symmetrical. Any delay asymmetry in the network will effectively cause a phase error of 50% of the asymmetry value. In addition, the phase synchronization is sensitive to packet delay variations in the network. With the use of hybrid fiber coaxial networks in combination with DOCSIS as an x-haul for mobile communications, it is challenging to provide accurate frequency and phase over the network. DOCSIS is a packet based network, and as such, it has the issue of network asymmetry and packet delay variations. Moreover, DOCSIS presents additional challenges related to asymmetry due to the nature of DOCSIS upstream scheduling, packet delay variations due to upstream scheduling, low bandwidth channels which causes larger packet transition times, and unknown delays and asymmetries in the CMTS and the cable modems.

Figure 4:
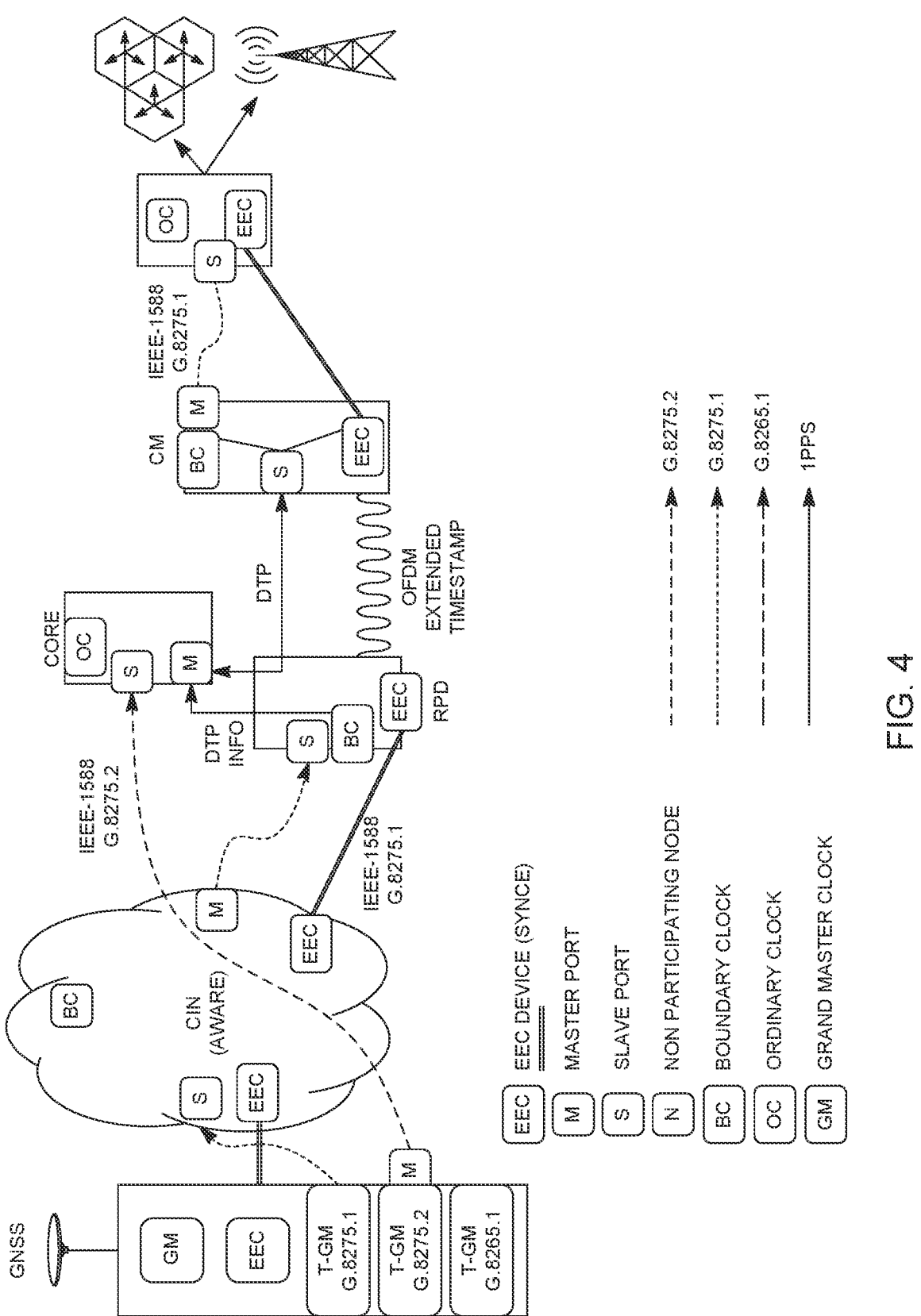
FIG. 4 illustrates an exemplary R-PHY architecture used as a backhaul for a cellular network.

Referring to FIG. 4, a system similar to that illustrated in FIG. 3, that is applicable to systems that include a Remote PHY Device (RPD). Also, a system similar to that illustrated in FIG. 3 is applicable to systems that includes a Remote MACPHY Device (RMD).

As generally previously described, the DOCSIS Timing Protocol (DTP) is a series of extensions to the DOCSIS protocol and the implementations of the DOCSIS cable modem and the CMTS are intended to support precise timing delivery over DOCSIS by leveraging the OFDM extended timestamp 272 and ranging functionality of the DOCSIS system. Frequency is addressed by coupling the cable modem Ethernet timing to the DOCSIS downstream symbol frequency, while time is addressed by coupling the cable modem PTP timestamp message to the DOCSIS extended timestamp. Time offset and asymmetry compensation over the DOCSIS segment is addressed through measurement, signalling, and ranging by providing time adjust values through the DTP messages. In general, the DTP involves synchronization of phase (e.g., time). The CMTS may be locked to a northbound GM clock (directly or through a series of one or more boundary clocks) using traditional PTP messages. The cable modem may provide PTP master functionality to applications that reside on its network.

When using DOCSIS as an x-haul for mobile networks, one of the challenges is the ability to support two different timing applications with different timing requirements on the single clock that resides in the CMTS. DOCSIS has strict limits on phase and frequency changes, while mobile does not have the same limitations. In some cases, the CMTS may need to make a large phase and/or frequency adjustment in order to re-lock to its time source. These can be, for example, when switching between two master clock sources which may have some time-offset, such as 20 microseconds between them. Or after a long holdover when there isn't a connection to the grandmaster clock, where the phase of one of the devices has drifted away significantly. When the connection to the master clock is recovered or switched, the CMTS may compensate for such phase offsets by only slow frequency changes, as DOCSIS does not allow performing phase steps and is bounded by a limited frequency change rate of 10 ppb/s. The correction of large phase offsets is traditionally corrected using various techniques. A technique involves using a sufficiently large step to the DOCSIS extended timestamp. Another technique would allow the DOCSIS symbol rate to exceed the permitted frequency change rate to quickly align the DOCSIS symbol rate and the extended timestamp (and the cable modems clock which relies on it) to the mobile requirements. These result in a significant outage on the entire DOCSIS system as cable modems may need to reset and/or re-range. Another technique involves phase corrections only by adjusting the DOCSIS symbol rate within the DOCSIS limitations. This may substantially extend an outage on the mobile backhaul path until the phase is corrected to the mobile requirements. A 50 microsecond phase offset may take up to 8 minutes to correct.

Figure 5:
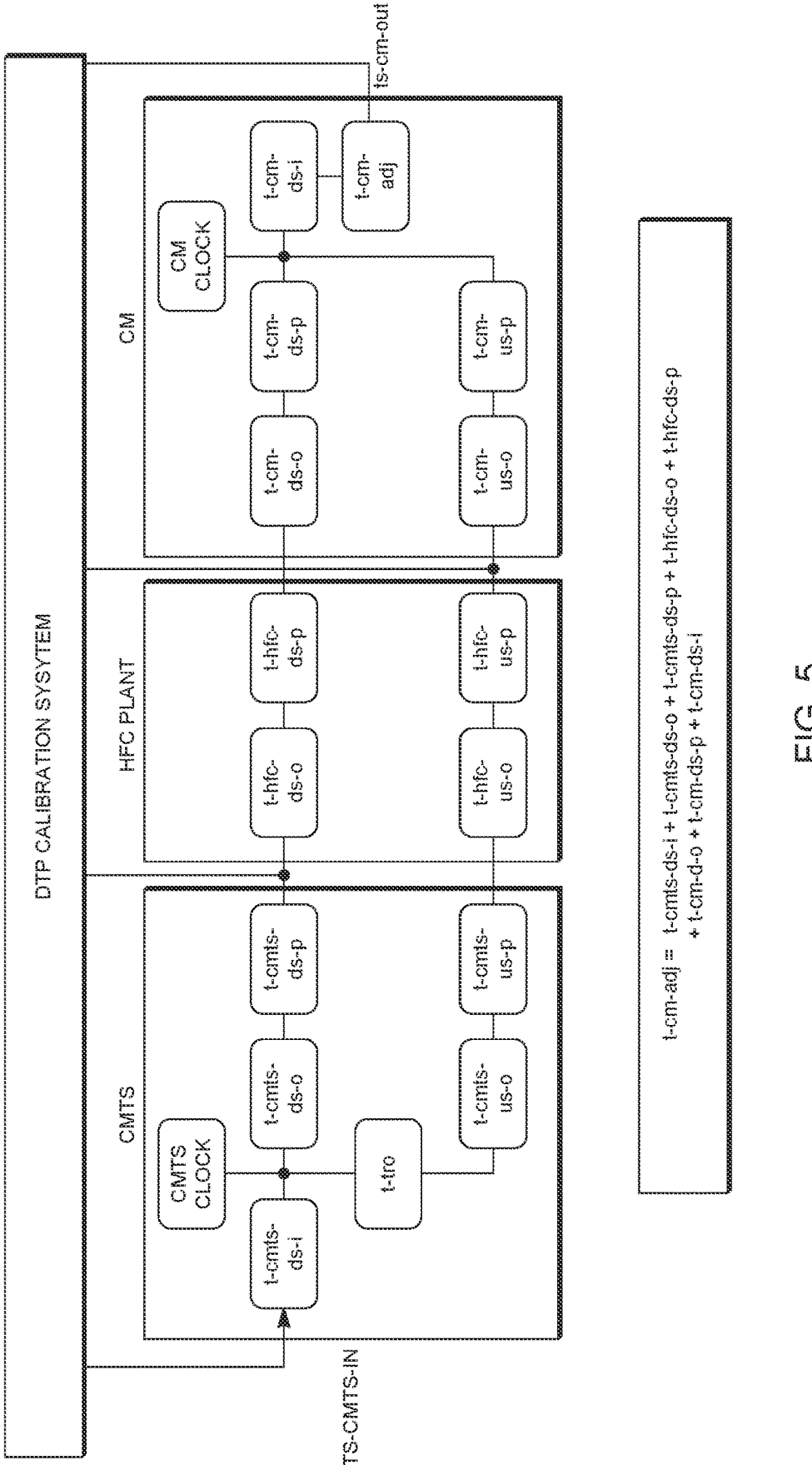
FIG. 5 illustrates DTP delay parameters.

Referring to FIG. 5, an exemplary diagram shows the parameters that are modelled and measured for asymmetry calculation for the DTP. The delay asymmetries inside the CMTS and the cable modems data paths and the PHYs may need to be determined, modelled, and measured per deployment. Also, delay asymmetries in the HFC (amplifiers, etc.) are also measured. After these parameters are characterized, the main factor that would influence the time adjust parameter (e.g., "t-cm-adj") would be changes in ranging that would be reflected in t-tro.

Rather than causing an outage, it is desirable to use the DTP compensation mechanism, which is traditionally a static parameter used to compensate for DOCSIS and HFC asymmetries, as a dynamic parameter modified to also compensate for ingress timing offsets, such as from PTP, that cannot be compensated for quickly within the limitations imposed by DOCSIS. When a large phase correction is required, the DOCSIS DTP master, such as the CMTS, RPD, RMD, or otherwise, determines whether a phase step (for large phase offsets) and/or a series of phase steps and/or a frequency slew up to the DOCSIS limit of 10 ppb/s can be used with a synchronized adjustment of the DOCSIS and DTP parameters. This allows the PTP master clock or other timing output in the cable modem to jump to the time as detected by the boundary clock slave in the CMTS (or otherwise) without causing the cable modem to reset and/or re-range.

Figure 6:
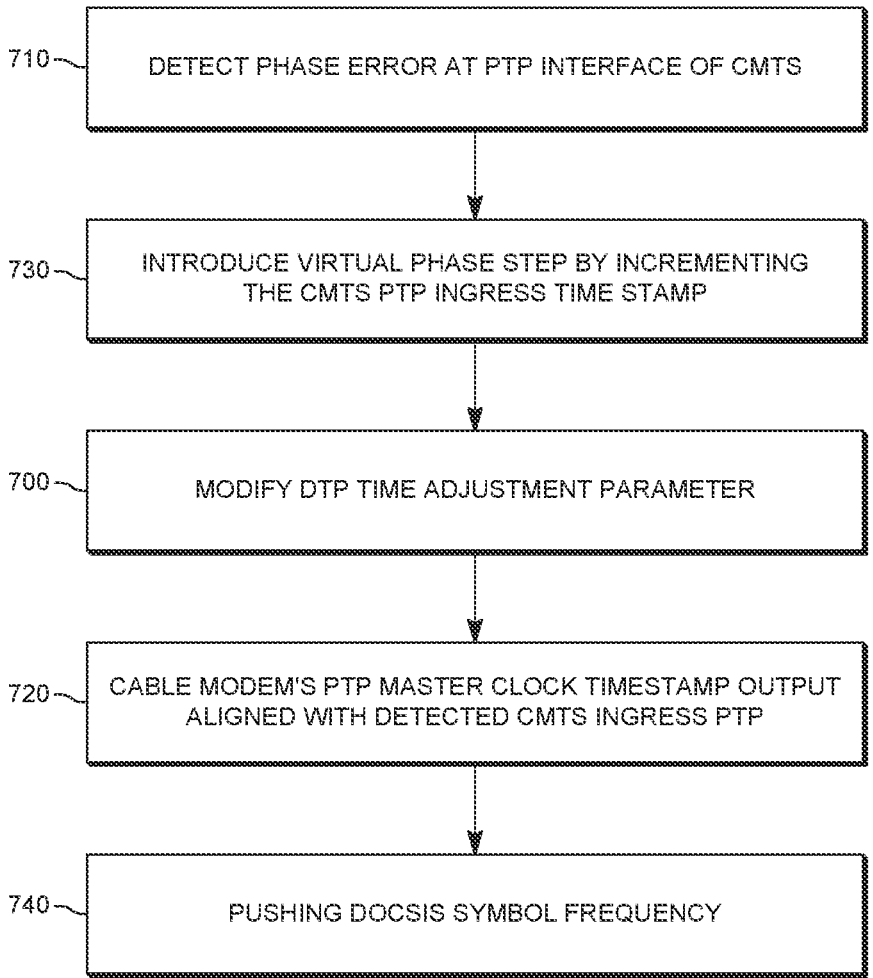
FIG. 6 illustrates one technique to synchronize timing.
Figure 7:
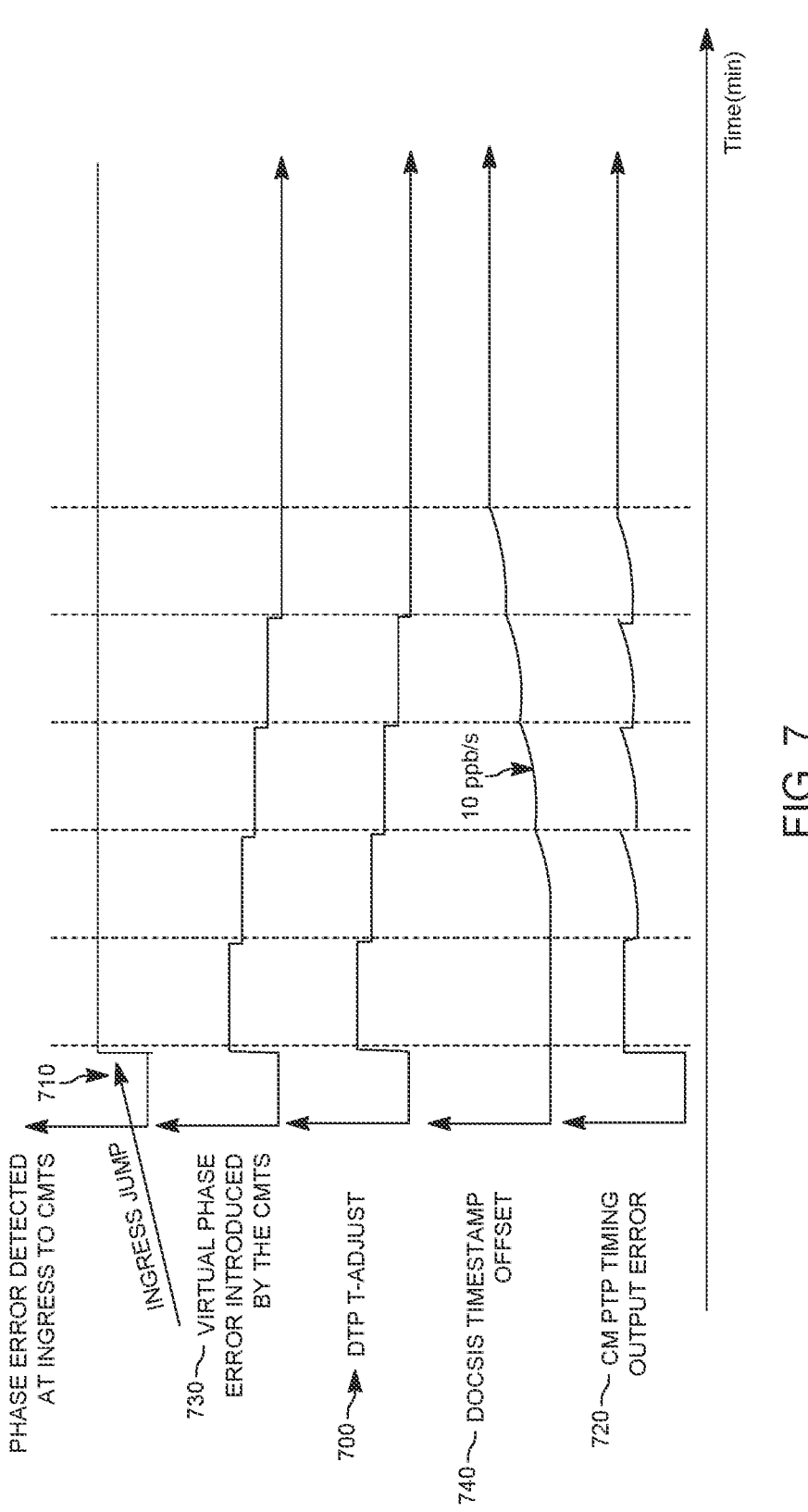
FIG. 7 illustrates the technique to synchronize timing of FIG. 6.

Referring to FIG. 6 and FIG. 7, a technique suitable for phase step recovery involves modifying the DTP time adjustment parameter 700 (e.g., "t-cm-adj") by the phase error detected by the CMTS on its ingress PTP interface 710. This 'jumps' the cable modem's PTP master clock timestamp output 720 to align with the detected CMTS ingress PTP thereby effectively eliminating the timing error out of the CM. In order to avoid not actually jumping the DOCSIS timestamps, a "virtual" phase step 730 is introduced by incrementing the CMTS PTP ingress timestamp by the required offset which "spoofs" the PTP technique that the phase error has been effectively eliminated. The DOCSIS symbol frequency, and thus the extended timestamp 740 is slowly pushed, always in a manner within the limitations of DOCSIS specifications, to recover the large phase offset and align it back to the PTP ingress timestamp. This may be accomplished by dividing the large phase offset into small phase recovery corrections (e.g., 100 ns every 1-2 minutes), each of which may be completed relatively quickly by frequency changes. Each small phase recovery correction will change both the "virtual" ingress phase step and the DTP time adjust parameter.

Figure 8:
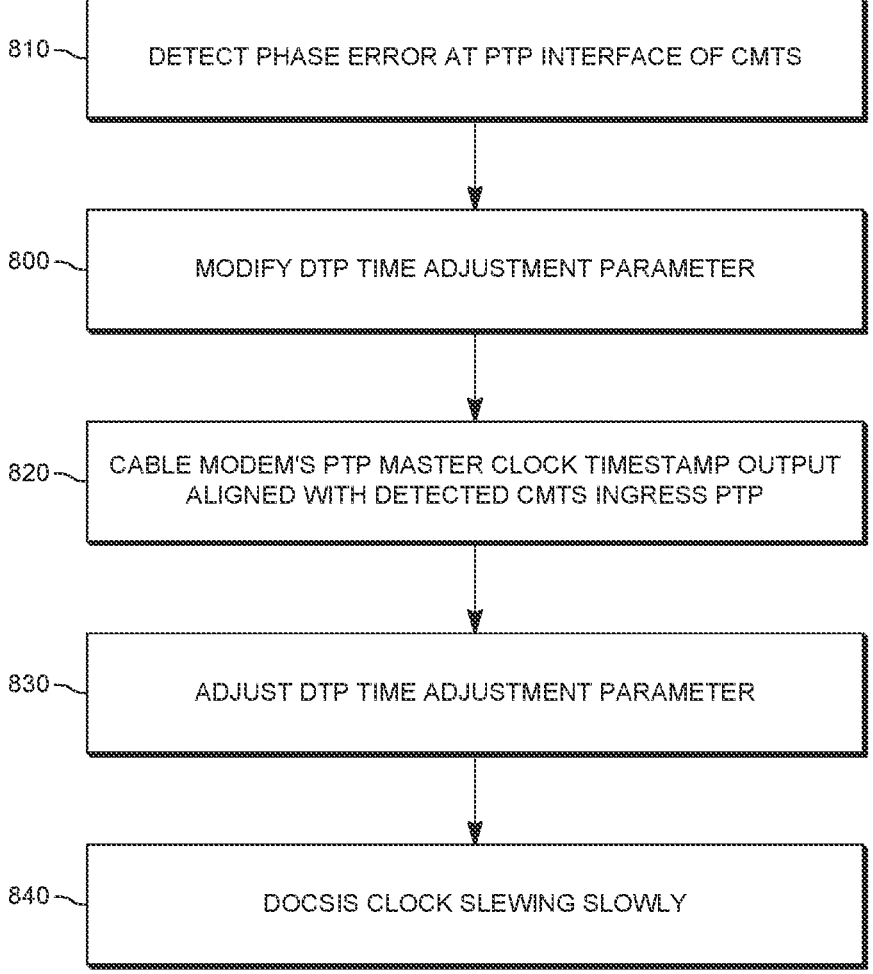
FIG. 8 illustrates another technique to synchronize timing.
Figure 9:
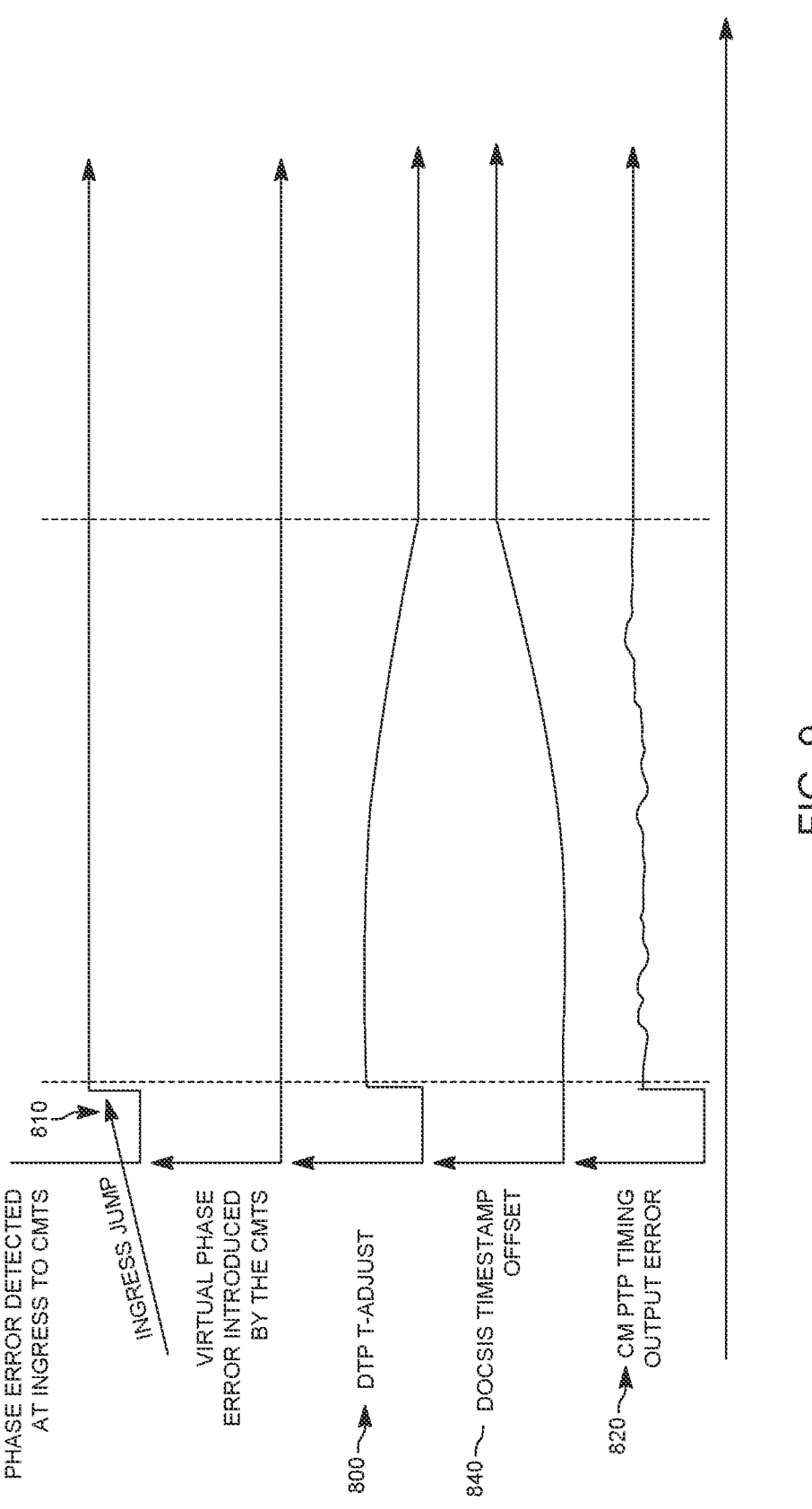
FIG. 9 illustrates the technique to synchronize timing of FIG. 8.

Referring to FIG. 8 and FIG. 9, for a frequency slew recovery the DTP time adjust parameter 800 may be modified by the phase error detected by the CMTS on its ingress PTP interface 810. This "jumps" the cable modem's PTP master clock timestamp output 820 to align with the detected CMTS ingress PTP, substantially eliminating the CM output timing error. The DOCSIS clock is slewing slowly within the limitations of DOCSIS to align the DOCSIS timestamp back to the PTP ingress 840. The DTP time adjust parameter 800 is adjusted, e.g., every few seconds, compensating for the phase adjustment of the DOCSIS timestamp 840, and may be calculated by the amount of phase recovered by the average DOCSIS clock frequency offset over that period (or in another manner). For example, if the DOCSIS clock is averaging a 100 ppb offset in a 1 second interval to reduce the large phase offset, the DOCSIS timestamp will appear to have moved 100 ns. The DTP adjust is also changed 100 ns over the same period and communicated to the cable modem through frequent DTP signalling (or in another manner).

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:

1. A method comprising:
   (a) a first device detecting a phase error of a clock of the first device;
   (b) the first device modifying a Data-Over-Cable Service Interface Specifications (DOCSIS) timing protocol parameter based upon the detected phase error, the DOCSIS timing protocol parameter used to modify a clock output of a second device different than the first device; and
   (c) decreasing the magnitude of the modification of the DOCSIS timing protocol parameter over time after detecting the phase error.

2. The method of claim 1 wherein a DOCSIS clock output of the first device is modified over time as the DOCSIS timing protocol parameter is modified in an opposing direction.

3. The method of claim 2 wherein the DOCSIS clock output of the first device is modified at a rate within a range specified by a corresponding DOCSIS protocol.

4. A method for adjusting a phase error comprising:
   (a) a first device detecting a phase error of a clock of the first device; and
   (b) the first device modifying a Data-Over-Cable Service Interface Specifications (DOCSIS) timing protocol parameter based upon the detected phase error, the DOCSIS timing protocol parameter used to modify a timestamp output by a clock of a second device different than the first device, wherein the DOCSIS timing protocol parameter is t-cm-adj.

* * * * *